P. K. DEDERICK.

Hay and Cotton Press.

No. 8,292. Reissued June 18, 1878.

WITNESSES

Will. C. Jordueston,

Wm. B. Prestocks.

INVENTOR

Peter K. Dederick

By Hill & Ellsworth

Hs ATTORNEYS.

THE NORRIS PETERS CO., PHOTO-LITHO., WASHINGTON, D. C.

UNITED STATES PATENT OFFICE.

PETER K. DEDERICK, OF ALBANY, NEW YORK.

IMPROVEMENT IN HAY AND COTTON PRESSES.

Specification forming part of Letters Patent No. 151,477, dated June 2, 1874; Reissue No. 8,292, dated June 18, 1878; application filed January 19, 1878.

*To all whom it may concern:*

Be it known that I, PETER K. DEDERICK, of Albany, in the county of Albany and State of New York, have invented a new and Improved Press, of which the following is a specification:

The invention will first be fully described, and then pointed out in the claims.

Figure 1:
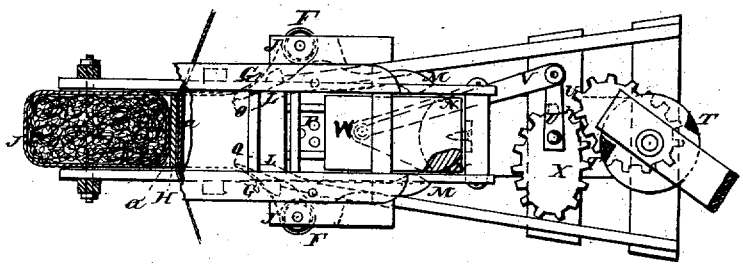
Figure 2:
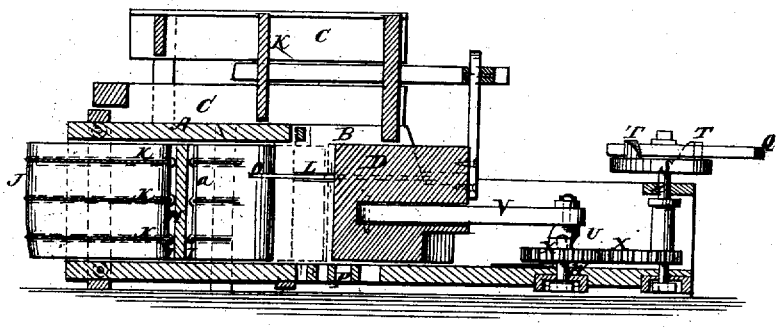

Figure 1 is partly a plan view and partly a horizontal section of my improved press, and Fig. 2 is a longitudinal sectional elevation.

Similar letters of reference indicate corresponding parts.

A represents the horizontal press-case, into which the hay is fed in batches through the space B, at the bottom of the hopper C, in front of the follower D, which compresses a batch at each forward motion against that already pressed in, all as described in Patents No. 132,566, dated October 29, 1972, and No. 132,639, dated October 29, 1872, for pressing hay, and in others for pressing cotton, dated May 19, 1874, No. 151,012, and January 7, 1873, No. 134,592; but said presses being specially designed for either hay or cotton, neither one would do well for both hay and cotton, which it is the essential object of this invention to accomplish, and which is effected by the employment of a long compressing-case, the same as in the hay-press, with a cloth roll, F, on each side, and an opening, G, through the case side for the cloth J, by which the bale is to be sacked, to be drawn in by the cotton which is pressed into it, the cloth being extended from one roller to the other at the beginning of the operation, so as to extend around the first bale, as represented in the drawings, and being cut at the end of each bale after it is tied, and discharged from the case.

The bales are separated from each other, as in my other presses, by followers H, put in the case through hopper C, in advance of the piston, from time to time, as often as a sufficient quantity for a bale has been pressed in. To inclose the ends of the bales, I now attach a piece of sacking, *a*, to each side of these followers before putting them in, and the said pieces to the ends of the bales by passing the ties through the grooves I in the followers behind said end pieces. As the ties have to be put in before the cloth is cut, I punch holes through the cloth at the followers, and pass ties through the holes while the bales are passing along in the case, and then tie the bales through slots in the sides of the case. Thus the bale is sacked on two sides and the ends, leaving the other two sides to be afterward covered by pieces sewed on, or similar cloth-rolls may be employed at top and bottom for covering those sides also.

If the case be made high enough for the length of the bales, which I contemplate, the bales will then be covered on all sides by the two cloth strips at the sides and the pieces carried on the followers H, leaving only the ends to be covered by sewing on pieces after the bales are discharged.

For condensing the hay or cotton preparatory to the delivery of it in advance of the piston D, so as to lessen the labor of stuffing it in, and also increase the amount of each batch, I now propose to extend the hopper C, as shown, to largely increase the space for the loose hay, and arrange therein a follower, K, so connected with the piston D or the devices for operating it that it will move back when the piston goes forward to allow the hopper to be filled, and when the piston returns will be pulled back to compact the hay or cotton in front of it, and deliver it into the space B.

To hold the substance being packed against springing back with the piston D, I now propose to employ one or more levers, L, on each side, pivoted at or about the middle, and so shaped at the ends M and arranged relatively to the piston that when it goes back its covers N will force the ends O inward, just in advance of the piston and in front of the hay, and thus hold it from following the piston back by expanding.

P represents holes, slots, or perforations in the bottom of the case to allow the dirt, gravel, and seed to fall through and escape from the hay. In pressing any loose material in a horizontal or inclined press a large amount of dirt and seed will always settle to the bottom, and, unless allowed to pass out through the bottom before the hay is pressed, the bottom side of the bale will be covered with dirt.

Q is the sweep which I now attach to the shaft by pivoting it on the top of the wheel, between the lugs or stops T, which hold it for turning the shaft, but allow of considerable play of the sweep between said studs for the purpose of recovering the power by the expansive force of the pressed material, independently of the sweep or horse lever, thereby preventing said expansive force of the material from being exerted to crowd the horses forward when the crank U and connecting-rod V pass a line drawn through the pivot W and the axis of the wheel X.

It will be observed that in my previous patents and applications on this class of presses, and on which this is described as an improvement—viz., No. 132,566, October 29, 1872; No. 132,639, October 29, 1872; No. 134,592, January 7, 1873, and application October 22, 1872, patented May 26, 1874, No. 151,203—that the sweeps or horse-levers are all fast; hence the expansive force of the pressed material must be severe on the horses, which, if utilized in reversing the power by means of a loose sweep, will entirely relieve them.

The loose sweep may be applied in the same manner directly to the crank or shaft of power shown in the previous applications referred to, and with the same effect.

Having thus fully described my invention, I claim as new and desire to secure by Letters Patent—

1. The combination, with press having side openings G G, of the rolls F F, substantially as and for the purpose described.

2. In that class of horizontal presses in which the hay is fed and pressed in sections by a reciprocating traverser and crank or toggle power, as set forth, the loose or adjustable sweep or horse-lever, for the purpose set forth.

3. The combination, with follower D and press-case, of the levers L, as and for the purpose specified.

4. In that class of baling-presses in which the hay is fed or pressed in sections by a reciprocating traverser, as shown, the feed-hopper C, extending beyond the feed-orifice B, and provided with a compacting-follower K, for the purpose described.

5. In that class of baling-presses in which the hay is fed and pressed in sections, a press-case provided with a screen bottom under the reciprocating traverser D, and in combination with the same, for the purpose set forth.

6. In a baling-press in which the material is compressed in sections by a reciprocating traverser, the pressing devices, so arranged and operated that the reaction or elasticity of the pressed material shall reverse the traverser without turning the horse-lever or sweep.

P. K. DEDERICK.

Witnesses:
W. A. SKINKLE,
R. J. VAN SCHOONHOVEN.